(No Model.)

G. W. GILL.
Egg Beater.

No. 237,741. Patented Feb. 15, 1881.

Witnesses:
G. W. Lockwood
Jno. D. O'Connor

Inventor:
Geo. W. Gill.

UNITED STATES PATENT OFFICE.

GEORGE W. GILL, OF COLUMBUS, OHIO.

EGG-BEATER.

SPECIFICATION forming part of Letters Patent No. 237,741, dated February 15, 1881.

Application filed January 14, 1881. (No model.)

*To all whom it may concern:*

Be it known that I, GEORGE W. GILL, of Columbus, Franklin county, and State of Ohio, have invented a new and useful Improvement in Egg-Beaters, of which the following is the specification.

Similar letters of reference indicate corresponding parts.

Figure 1:
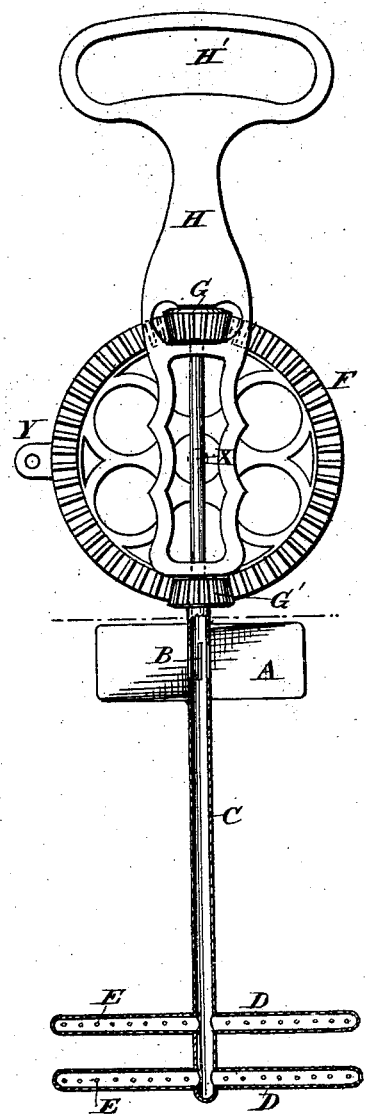
Figure 2:
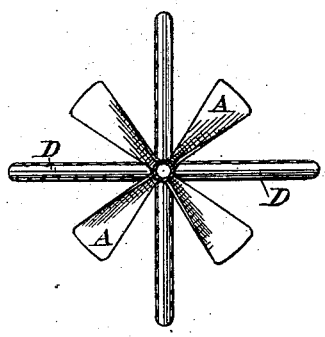
Figure 3:
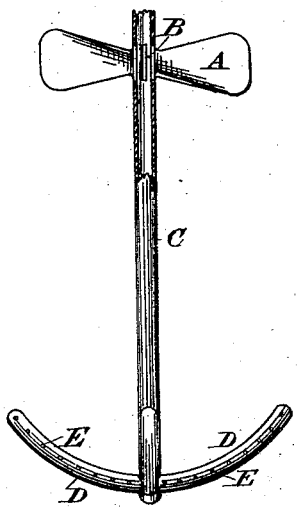

Figure 1 represents a side elevation, partly in section. Fig. 2 represents a plan view of the agitators. Fig. 3 represents a modified form of agitators, partly in section.

My invention has for its object to furnish an improved device for beating eggs and for similar purposes, simple in construction; and it consists in the construction and combination of various parts of the device, as hereinafter more fully described.

H represents a frame, having at the upper end a handle, H', for convenience of holding the beater while in use.

Upon the central part of the frame is formed or attached thereto a gudgeon, X, upon which is placed a wheel, F, to which is attached or upon which is formed a crank pin or handle, Y, by means of which motion is imparted to the device.

Upon the inner face of the rim of the wheel F are formed gear-teeth, into which the pinions G G' mesh. The pinions G G' are placed upon the hollow tube C, one at the upper extremity, the other below it, so as to mesh with the gear-wheel F. The pinion G revolves loosely upon the hollow tube, and is kept from slipping down upon the said tube by a collar, pin, or other suitable device.

Below the pinions G' the hollow tube is provided with four or more slots, B. Between and in line therewith are a series of fans, A, secured, which may be flat, spiral, or in any desirable form. The object of the fans is to force the air through said slits and tubes and through the apertures into the agitators D, which are perforated in order to permit the air to pass into the material to be beaten or agitated.

The beaters or agitators may be either straight or curved, as may be desired.

I am aware that the frame for revolving the stem or tube carrying beaters is not new, and therefore I lay no claim thereto; but

What I claim as new, and desire to secure by Letters Patent, is—

1. In an egg-beater, fans secured to the hollow slotted and perforated stem, combined with the hollow stem, to which are connected a series of perforated beaters, substantially as and for the purpose set forth.

2. In combination with the gearing for actuating the beater, the fans secured to the hollow tube between the slots, the tubes provided with openings at the lower part and communicating with the perforated agitators, which are secured to said hollow tube, substantially as described.

GEO. W. GILL.

Witnesses:
GEO. M. LOCKWOOD,
JNO. D. O'CONNOR.